United States Patent

Yasuda et al.

[11] Patent Number: 5,523,842
[45] Date of Patent: Jun. 4, 1996

[54] METHOD OF INTERFERENCE FRINGE ANALYSIS FOR DETERMINING ASPECT OF SURFACE GEOMETRY

[75] Inventors: Kenji Yasuda, Kitamoto; Masami Yoneda, Saitama-ken, both of Japan

[73] Assignee: Fuji Photo Optical Co., Ltd., Saitame-ken, Japan

[21] Appl. No.: 483,600

[22] Filed: Jun. 7, 1995

Related U.S. Application Data

[63] Continuation of Ser. No. 90,686, Jun. 22, 1993, abandoned.

[30] Foreign Application Priority Data

Jun. 22, 1992 [JP] Japan ................................ 4-162528

[51] Int. Cl.$^6$ ................................................ G01B 9/02
[52] U.S. Cl. ............................................ 356/359; 356/360
[58] Field of Search .................................. 356/359, 360, 356/345

[56] References Cited

U.S. PATENT DOCUMENTS 4,832,489  5/1989  Wyant et al. ............................ 356/359

Primary Examiner—Samuel A. Turner
Attorney, Agent, or Firm—Keck, Mahin & Cate

[57] ABSTRACT

A method for interference fringe analysis in which a subject surface is located in parallel to a reference surface and multiply step shifted a specific distance for each step to derive data and images of interference fringes for determining aspects of the geometry of the subject surface.

8 Claims, 3 Drawing Sheets

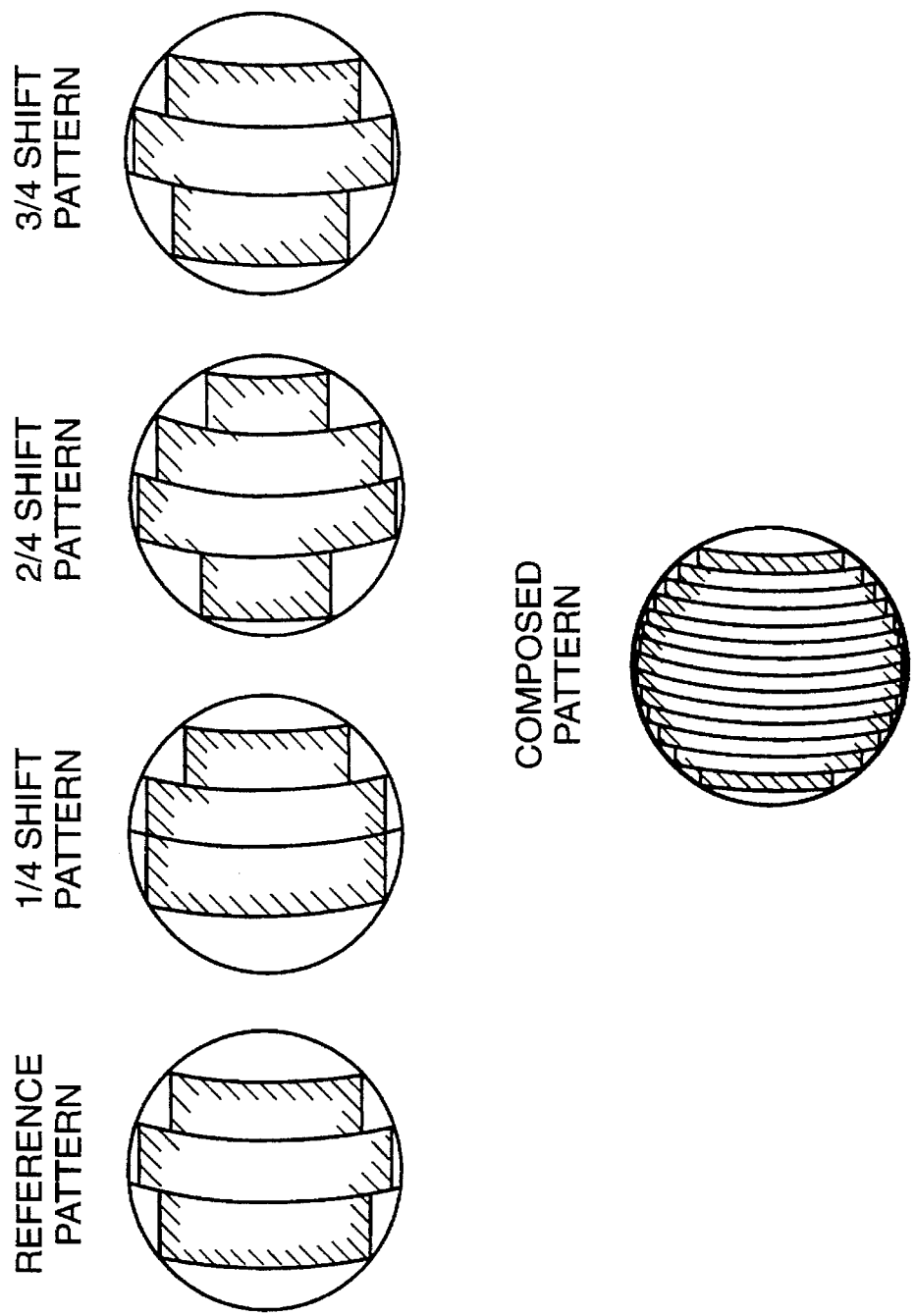

METHOD OF INTERFERENCE FRINGE ANALYSIS FOR DETERMINING ASPECT OF SURFACE GEOMETRY

This is a continuation of Ser. No. 08/090,686, filed on Jun. 22, 1993, abandoned.

BACKGROUND OF THE INVENTION

1. Field of the Invention

This invention is related to a method of interference fringe analysis for determining aspects of the geometry of a subject surface, such as surface roughness and/or surface irregularities or unevenness, based on interference fringes generated between the subject surface and a reference surface.

2. Description of Related Art

In recent years, with a highly improved surface finishing accuracy of mechanical parts, optical parts and semiconductor parts, techniques are needed for measuring or examining the roughness of finished surfaces and/or the unevenness of finished surfaces with a high accuracy.

One such measuring or examining technique which is well known in the art is to analyze interference fringes or an interference pattern produced between two surfaces, namely a reference surface and a test subject surface, for examining surface conditions. Fizeau interferometers are also well known in the art and widely used to produce interference fringes on which an analysis is made. In order to produce contrasty interference fringes, it is essential for such a Fizeau interferometer that light is reflected in substantially the same quantity from the reference surface and the test surface. Because of the demand for quantitative consistency of reflected light between the two surfaces, when measuring or examining a test surface with a high reflectance, the reference surface must have a reflectance which is as high as that of the test surface. In this instance, what is called "multiple interference" is induced or led between the two surfaces, resulting in thin interference fringes. Another technique also well known in the art, is fringe scanning, in which interference fringe analysis is conducted by examining changes in brightness of interference fringes induced following changes in relative distance between a reference surface and a test surface. Because of a high measuring or testing accuracy, this fringe scanning technique is widely used for interference fringe analysis. Since the fringe scanning technique must provide interference fringes having a $\cos^2\Theta$ brightness distribution, it is hardly available to highly reflective surfaces which generally produce thin interference fringes only.

When analyzing surface conditions from such thin interference fringes, the surface analysis is made based on pitches at which center lines of the respective thin interference fringes, which can be detected in conventional manners, are distributed and/or the roundness, or otherwise the straightness, of the respective thin interference fringes. For accurately measuring or examining a test surface, at least several interference fringes must be formed within a test area. In order to measure or examine an optically smooth test surface, the test surface is intentionally inclined relative to a reference surface so as to increase the number of interference fringes. However, if the test surface is inclined at a large angle relative to the reference surface so as to increase the number of interference fringes, since, in spite of a greatly increased amount of apparent information based on the geometric distribution of interference fringes, each interference fringe becomes nearly straight, it is hard to increase the substantial accuracy of measurement or examination. For this reason, the inclination of test surface relative to a reference surface is limited to some extent.

In the application of the conventional interference fringe analysis to automatic analyses, since the resolution of interference fringes depends upon the spatial resolving power of an image input device, such as TV cameras, it is also hard to increase the substantial accuracy of measurement or examination.

As described above, the number of points relative to the center of interference fringes, information or data of geometry relating to which are directly sampled, is inevitably determined based on the number of interference fringes, and the geometry of a test surface between adjacent interference fringes must be determined by means of interpolation. This leads to a greatly increased number of interference fringes desirably and precisely distributed over the test surface for accurate measurement or examination. Interpolation is available only to continuously and smoothly curved optical surfaces, such as polished surfaces which are ideally curved optical surfaces. Interpolation is, however, hardly available to metal surfaces finished by means of super mirror grinding. Moreover, interpolation is difficult or almost impossible to be applied to part of a test surface where no adjacent interference fringes appear. For this reason, it is desired to increase the number of interference fringes as much as possible so as to distribute them over the whole area of the test surface.

SUMMARY OF THE INVENTION

It is therefore an object of the present invention to provide a method of providing a composed pattern of interference fringes which provides an increase in the number of interference fringes per unit area of a test subject surface without reducing positional information obtained on a single interference fringe. This object of the present invention is achieved by providing a method of providing a composed pattern of interference fringes between a subject surface and a reference surface on which an investigation or analysis is made so as to reveal a surface condition, such as surface roughness and/or unevenness, of the subject surface. This interference fringe analysis includes providing of data of a reference pattern of interference fringes which are generated between the subject surface and reference surface located parallel to the subject surface at a specified separation or at a specified distance. Then, the subject surface is moved stepwise an equal fragmentary distance of the specified distance per unit time away from the reference surface while, being kept in parallel to the reference surface until interference fringes shift in position by one pitch and data of a shifted interference pattern is provided and memorized for every movement of the subject surface by the equal fragmental distance away from the reference surface. The data of a plurality of interference patterns thus provided are composed after being subjected to necessary image processing, such as smoothing, binary coding, fringe reducing and matching. Finally, the composed data are represented as a visual interferogram which is observed to investigate and analyze a geometry of the subject surface. Practically, since the composed data only represent a discontinuous surface geometry of the subject surface, it is preferred to process the composed data by interpolation so as to alter them so that they are representative of a continuous geometry of the subject surface.

In this interference pattern analysis, if the movement of the subject surface by the equal fragmental distance away from the reference surface is repeated n times so as to shift interference fringes in position by one pitch, composed data is considered from data of the reference pattern of interference fringes and data of first to (n−1)th pattern of interference fringes. This composed data is considered to be what is obtained from an interference pattern with a fringe sensitivity of 1/n. In other words, an interference pattern visibly represented from the composed data provides an increase in the number of interference fringes per unit area of the test subject surface without reducing positional information of the reference interference fringes.

BRIEF DESCRIPTION OF THE DRAWINGS

The above and other objects and features of the present invention will be fully and clearly understood from the following detailed description with respect to a preferred embodiment thereof when considered in conjunction with the accompanying drawings, in which:

FIG. 3 is an explanatory illustration of interference fringe patterns showing an increased area of analysis.

DETAILED DESCRIPTION OF THE PREFERRED EMBODIMENT

Figure 1:
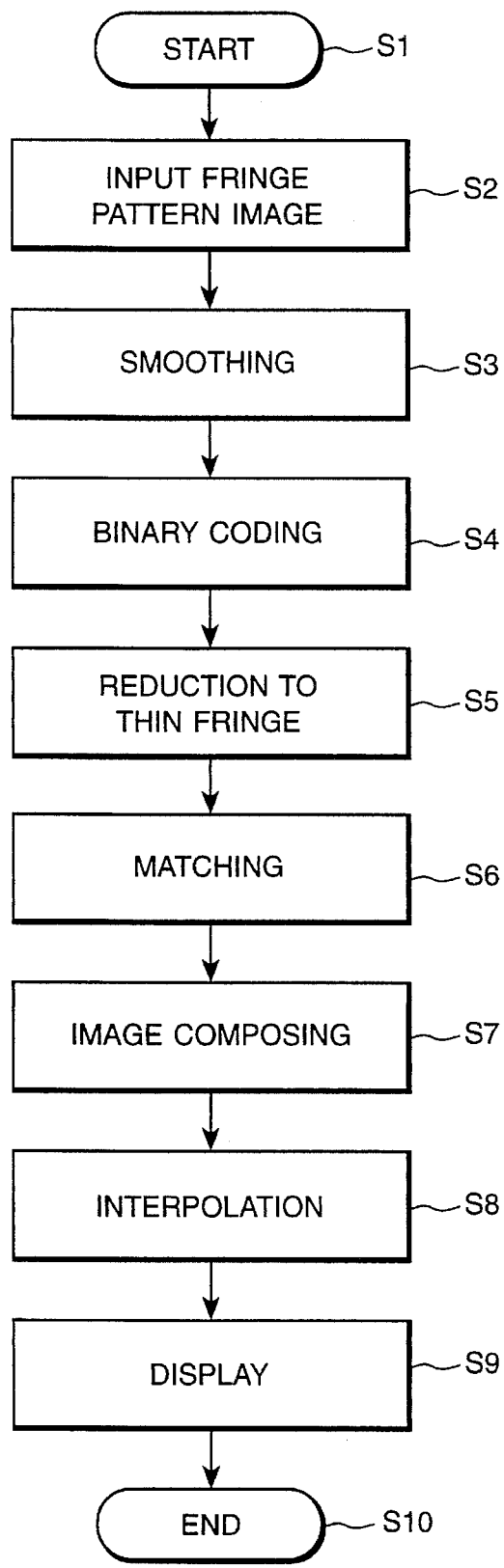
FIG. 1 is a flow chart illustrating a sequence of providing a composed interference fringe pattern for analyzing surface conditions in accordance with a preferred embodiment of the present invention.
Figures 2A, 2B, 2C, 2D:
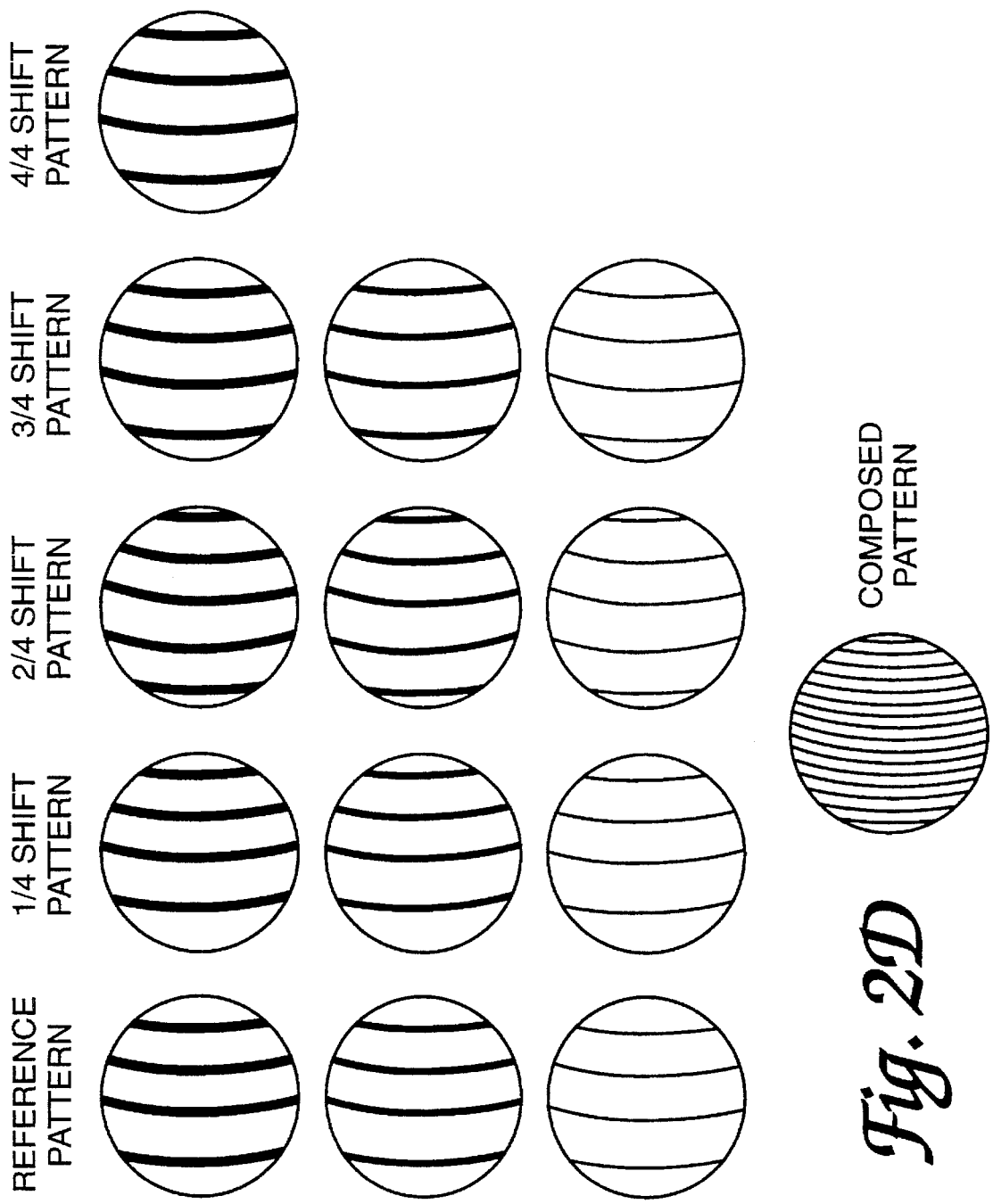
FIGS. 2A to 2D show interference fringe patterns processed by means of the sequence shown in FIG. 1.

Referring to the drawings in detail and, in particular, to FIG. 1, which is a flow chart depicting the logic of interference fringe analysis in accordance with a preferred embodiment of the present invention, the flow chart logic commences at step S1 and control passes directly to function block S2. The steps carried out by this function block are: 1) forming a pattern of interference fringes between a reference surface and a test surface, 2) picking-up interference patterns of patterns of pitch altered interference fringes, and 3) processing and memorizing video data of the interference patterns in an image memory device. For this image memory device, utilization is made of an 8-bits frame memory, having a definition of 512×512 picture elements, and a magnetic disk device. With the image memory device, data of every interference pattern of interference fringes is memorized in the frame memory once and, then, transferred by means of a DMA transfer device to the magnetic disk device at a high speed. In this instance, at first, the two surfaces are placed in parallel at a specific axial distance so as to form a reference pattern of interference fringes. Then, the two surfaces are axially shifted to change the axial distance therebetween, while being kept parallel to each other until the pattern of interference fringes is altered to be doubled in separations or pitches as wide as a standard separation or pitch at which the two interference fringes of the reference pattern are formed. During this alteration of separations, interference patterns of the pattern of interference fringes are picked up every ¼ standard separation or pitch of alteration. These five interference patterns, which are referred to herein as a reference interference pattern, a ¼ pitch shifted pattern interference pattern, a 2/4 pitch shifted pattern interference pattern, a ¾ pitch shifted pattern interference pattern, and a one pitch shifted pattern interference pattern, respectively, and shown in FIG. 2A, are memorized as video data in the image memory. The number of shifted interference patterns is not necessarily four but depends upon how precise the analysis of interference fringes is required to be.

Thereafter, smoothing, binary coding and fringe reducing are conducted for the video data of the reference interference pattern, and the ¼-¾ shift pitch shifted pattern interference patterns as depicted in function blocks S3, S4 and S5, respectively. Patterns of interference fringes represented by the video data after the processing of binary coding and fringe reducing are shown in FIGS. 2B and 2C, respectively. The smoothing and binary coding of interference pattern data are preprocessing conducted before entering into a substantial analysis in order to eliminate or suppress such noise as generally contained in an interference pattern of interference fringes and eliminate or correct unevenness in contrast of the interference pattern of interference fringes. The fringe reducing is made in order to detect or perceive a ridge line or peak line of the respective interference fringe in the binary coded interference pattern, which is the principal subject line of interference fringe enolization, and reduce it as thin as possible if the ridge line is larger in width than one picture element. The reducing of ridge lines eliminates data dispensable or unnecessary for interference fringe analysis.

Subsequently, control passes to matching function block S6 where interference fringe orders are assigned as data of fringe height to the respective interference fringes. As a consequence of matching, the video data are translated to represent an interference pattern of three-dimensional interference fringes from an interference pattern of two-dimensional interference fringes. In this matching processing, interference fringe orders are generally given as fringe height information by an operator. However, such fringe information may be automatically assigned to the respective interference fringes. If, due to noises, an interference fringe is discontinuous, joining processing is carried out by means of the assignment of its peculiar interference fringe order.

Next, data processing is made in function block S7 for composing video data so as to provide a composed three-dimensional pattern interference pattern of interference fringes from the video data of the standard pattern interference pattern and the ¼- 3/4 pitch shifted pattern interference patterns. The matching is the processing to compose video data of interference fringes for every specified location. The representation of composed video data is shown in FIG. 2D. The video data of the composed pattern of interference fringes can be handled so as to be equivalent to video data extracted from interference fringes when the interference pattern is generated with a fringe sensitivity reduced to one fourth. Thereafter, an interpolation is conducted in function block S8 to interpolate the composed video data based on positional information of the interference fringes so as to obtain positions between adjacent interference fringes, by means of which data continuous aspect of the geometry of the subject surface can be recognized.

The flowchart logic is carried out for a great number of very tiny parts of the test surface so as to cover the whole area of the test surface, thereby providing data of a pattern interference pattern of interference fringes covering the whole area of the test surface after all. The interference fringes pattern interference pattern data is visually represented as a configuration interference pattern of the whole test surface on a display device, such as a CRT and an X–Y plotter at step S9. Then, control is passed to end at step S10.

With the interference fringe analysis according to the present invention, interference fringes appear with an increased number per unit area, which reduces a region in which interference fringes are assigned interference fringe orders, so as to realize measurements with a high reliability. Furthermore, an increased number of interference fringes, which are displayed in a circular visual field as shown in FIG. 3, cause a reduction in the area lacking interference fringes. As is apparent from a comparison of respective pattern interference patterns before image composing at step S7, namely a reference interference pattern, a ¼ pitch shifted pattern interference pattern, a ²⁄₄ pitch shifted pattern interference pattern, and a ¾ pitch shifted pattern interference pattern with one another, although shifting of an interference fringe interference pattern by ¼ pitch causes a change in the area available to the interference fringe analysis (which is shown inside a shaded contour in FIG. 3), a remarkably large area remains unavailable to the interference fringe analysis in any pattern interference pattern. However, the circular visual field is filled with interference fringes, which are attributable to an increase in the number of interference fringes as a result of image composing, so as to be entirely available to the interference fringe analysis.

In the interference fringe analysis according to the present invention, data of a one pitch shifted pattern interference pattern is memorized as well as data of a reference interference pattern, a ¼ pitch shifted pattern interference pattern, a ²⁄₄ pitch shifted pattern interference pattern and a ¾ pitch shifted pattern interference pattern. Consequently, measurement can be made to detect disturbance of the interferometer occurring within a time interval of shifting interference fringes by one pitch. This is enabled to perform a comparative calculation of a reference pattern interference pattern and a one pitch shifted pattern interference pattern. Otherwise, measurement of disturbance of the interferometer may be made by means of a comparative calculation of two reference interference patterns before and after analysis. However, the former comparative calculation is more effective because it can detect the stability of a drive system of the interferometer.

Whereas the interference fringe analysis has been described with respect to an analysis with the use of vertical interference fringes, nevertheless, horizontal interference infringes may be used together with vertical interference fringes. The use of a combination of horizontal and vertical interference fringes provides a considerable decrease in the area which is unavailable to the interference fringe analysis. Further, whereas the interference fringe analysis has been described with respect to the use of open interference fringes which are generally provided by test subject surfaces with a relatively high surface accuracy, nevertheless, it may use circular or closed loop interference fringes.

It is to be understood that although a Fizeau interferometer is utilized in this embodiment, nevertheless, utilization may be made of any type of interferometer, as long as it provides data of an interference pattern of the pattern of interference fringes every ¼ shift pitch.

It is also to be understood that although the present invention has been described in detail with respect to a preferred embodiment thereof, various other embodiments and variants may occur to those skilled in the art. Such other embodiments and variants which fall within the scope spirit of the invention and are intended to be covered by the following claims.

What is claimed is:

1. A method of providing interference fringes between a subject surface and a reference surface based on which aspects of the geometry of the subject surface are determined, said method of providing interference fringes comprising the steps of:

(a) generating first data representative of a reference interference pattern of reference interference fringes between said subject surface and said reference surface located with a preselected parallel separation;

(b) generating second data representative of a plurality of shifted patterns of interference fringes between said subject surface and said reference surface by shifting said subject surface relative to said reference surface by a shift distance necessary to shift each of said interference fringes by one pitch while keeping said reference and subject surfaces in parallel;

(c) reducing a thickness of each interference peak line detected while generating the first data and the second data to eliminate unnecessary data;

(d) generating composed data from said first and second data representative of said reference interference and shifted patterns of interference fringes; and (e) visually representing said composed data as an interference pattern of interference fringes from the geometry of said subject surface.

2. The method of claim 1, wherein said composed data is interpolated based on positional information of said interference fringes.

3. The method of claim 1, wherein the shifting of said subject surface is effected for a distance equal to 1/n said shift distance.

4. The method as defined in claim 3, wherein n is 4.

5. The method as defined in claim 1, wherein said interference pattern is selected from the group consisting of fringes and closed loops of fringes.

6. The method as defined in claim 5, wherein the interference pattern is vertical fringes.

7. The method as defined in claim 5, wherein the interference pattern is horizontal fringes.

8. The method as defined in claim 5, wherein the interference pattern includes both horizontal and vertical fringes.

* * * * *